(12) United States Patent  
Hirafuji (10) Patent No.: US 12,491,721 B2  
(45) Date of Patent: Dec. 9, 2025

(54) PRINTER, PRINTING CONTROL METHOD, AND STORAGE MEDIUM

(71) Applicant: SATO HOLDINGS KABUSHIKI KAISHA, Tokyo (JP)

(72) Inventor: Takuma Hirafuji, Tokyo (JP)

(73) Assignee: SATO CORPORATION, Tokyo (JP)

( * ) Notice: Subject to any disclaimer, the term of this patent is extended or adjusted under 35 U.S.C. 154(b) by 128 days.

(21) Appl. No.: 18/267,009

(22) PCT Filed: Nov. 10, 2021

(86) PCT No.: PCT/JP2021/041327  
§ 371 (c)(1),  
(2) Date: Jun. 13, 2023

(87) PCT Pub. No.: WO2022/172537  
PCT Pub. Date: Aug. 18, 2022

(65) Prior Publication Data  
US 2024/0100858 A1    Mar. 28, 2024

(30) Foreign Application Priority Data

Feb. 15, 2021    (JP) .................................. 2021-021445

(51) Int. Cl.  
*B41J 2/355*    (2006.01)  
*B41J 2/32*    (2006.01)  
(Continued)

(52) U.S. Cl.  
CPC .............. *B41J 2/3555* (2013.01); *B41J 2/32* (2013.01); *B41J 2/355* (2013.01); *B41J 2/36* (2013.01);  
(Continued)

(58) Field of Classification Search  
CPC ..... B41J 2/3555; B41J 2/36; B41J 2/32; B41J 2/355; G06F 3/1293; G06F 3/1297; G06K 15/1886; G06K 15/028  
See application file for complete search history.

(56) References Cited

U.S. PATENT DOCUMENTS

2009/0309946 A1    12/2009  Saquib  
2011/0181678 A1 *  7/2011   Mito .......................... B41J 2/36  
                                                                347/195  
(Continued)

FOREIGN PATENT DOCUMENTS

JP    H02175264 A  *  7/1990  ................ B41J 2/36  
JP    2002137354 A  *  5/2002  ............. B41C 1/055  
(Continued)

*Primary Examiner* — Yaovi M Ameh  
(74) *Attorney, Agent, or Firm* — Foley & Lardner LLP (57)    ABSTRACT

An embodiment of the present invention provides a printer configured to print on a print medium. The printer includes a thermal head and a control unit. The thermal head has a plurality of heating elements that are arranged in a line. The control unit is configured to control thermal energy to be applied to the plurality of heating elements, in accordance with information based on image data. The information includes whether to apply a pulse of energizing current in each of a plurality of periods being preset during a scanning line time for one line. The plurality of periods is set in an order from a long period to a short period during the scanning line time.

16 Claims, 9 Drawing Sheets

(51) Int. Cl.
*B41J 2/36* (2006.01)
*G06F 3/12* (2006.01)
*G06K 15/02* (2006.01)

(52) U.S. Cl.
CPC .......... *G06F 3/1293* (2013.01); *G06F 3/1297* (2013.01); *G06K 15/1886* (2013.01); *G06K 15/028* (2013.01)

(56) References Cited

U.S. PATENT DOCUMENTS

2013/0147893 A1   6/2013   Imai
2018/0009233 A1   1/2018   Uryu et al.
2018/0257394 A1*  9/2018   Ito ............................. B41J 2/32

FOREIGN PATENT DOCUMENTS

| | | |
|---|---|---|
| JP | 2007-050677 A | 3/2007 |
| JP | 2008-036819 A | 2/2008 |
| JP | 2017-042936 A | 3/2017 |
| JP | 2018-001653 A | 1/2018 |
| JP | 2018-047642 A | 3/2018 |
| JP | 2018-149689 A | 9/2018 |

\* cited by examiner

PRINTER, PRINTING CONTROL METHOD, AND STORAGE MEDIUM

FIELD

The present invention relates to a printer, a printing control method, and a storage medium.

BACKGROUND

In general, a thermal head supplies a predetermined current independently to a plurality of heating elements that are arranged in a line shape, to heat them and form a dot pattern, for example, on a print medium having a thermal color developing layer, whereby it prints information. In this process, color development of a dot corresponding to a heating element is controlled by time during which current is supplied to the heating element (that is, a pulse width of energizing current).

A thermal head has a heat storage characteristic of storing heat in heating elements as current is continuously supplied to the same heating elements. In view of this, in a known heat history control method, a thermal energy of a heating element is made constant by adjusting a pulse width of energizing current depending on a history of energizing the heating element (for example, Japanese Unexamined Patent Application Publication No. 2017-42936).

BRIEF SUMMARY

Technical Problem

Japanese Unexamined Patent Application Publication No. 2017-42936 discloses a technique for controlling ON time of a heating element corresponding to a pixel of print data of a current line, in accordance with a heat history pattern. Unfortunately, efficiency in applying thermal energy to a heating element is not considered. For example, it is not disclosed how to set (allocate) ON times of heating elements during a scanning line time for one line after the ON times have been determined.

In view of these circumstances, an object of the present invention is to efficiently apply thermal energy to heating elements of a thermal head.

Solution to Problem

An embodiment of the present invention provides a printer configured to print on a print medium. The printer includes a thermal head and a control unit. The thermal head has a plurality of heating elements that are arranged in a line. The control unit is configured to control thermal energy to be applied to the plurality of heating elements, in accordance with information based on image data. The information includes whether to apply a pulse of energizing current in each of a plurality of periods being preset during a scanning line time for one line. The plurality of periods is set in an order from a long period to a short period during the scanning line time.

Advantageous Effects

An embodiment of the present invention enables efficiently applying thermal energy to heating elements of a thermal head.

DETAILED DESCRIPTION

Figure 1:
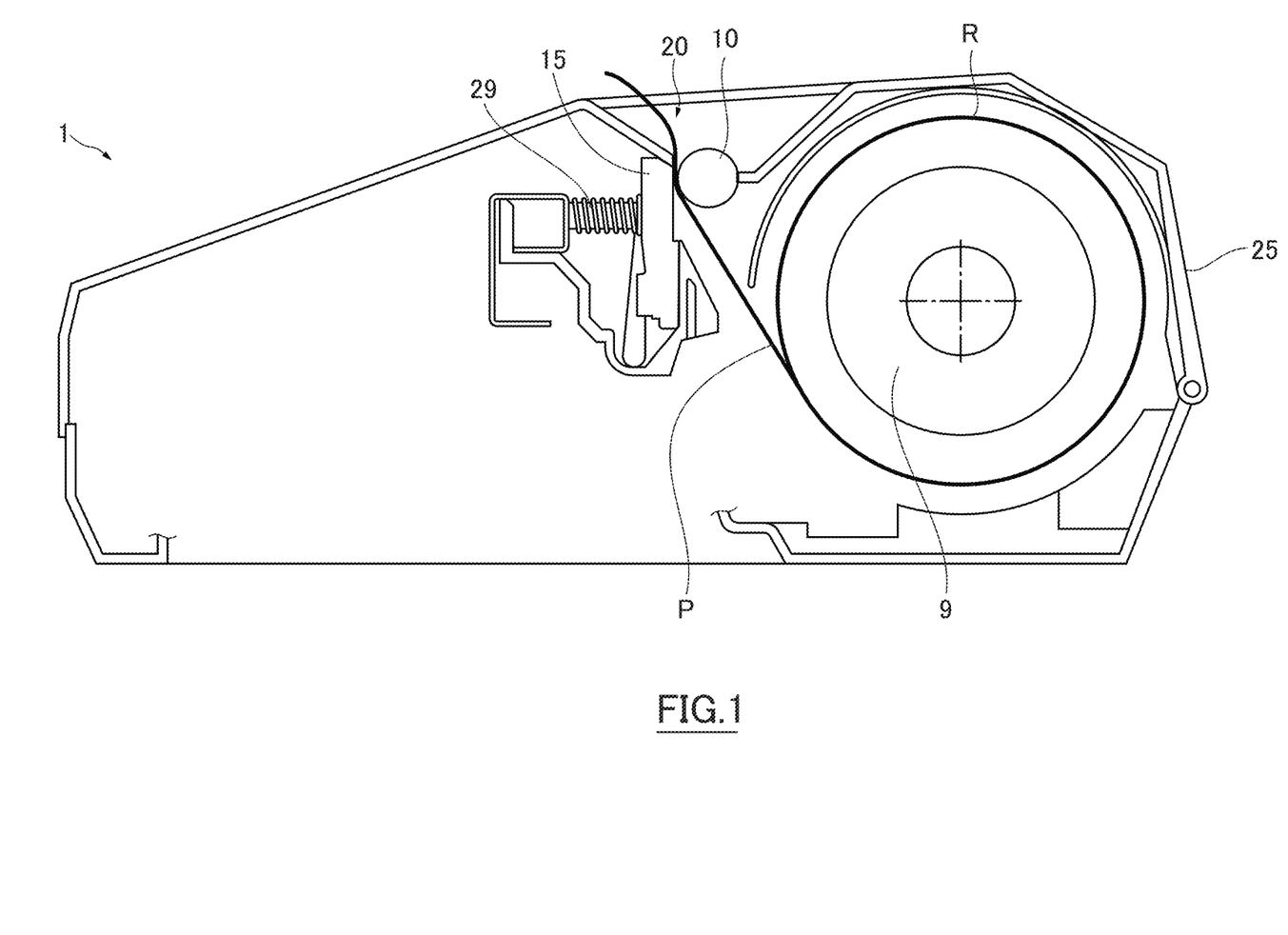
FIG. 1 is a schematic sectional view of a printer for explaining a printing operation of the printer of an embodiment.

A printer 1 according to an embodiment is illustrated in FIG. 1. The printer 1 is a direct thermal printer that prints labels having a thermal color developing layer on one side.

As shown in FIG. 1, the printer 1 includes a paper roll-containing chamber 9, a platen roller 10, a thermal head 15, a printer cover 25, and a coil spring 29. A paper roll "R" can be filled in the paper roll-containing chamber 9 by opening and closing the printer cover 25.

The paper roll "R" is a strip continuous paper "P" that is wound into a roll shape. Although not shown, in an embodiment, the continuous paper "P" includes, for example, a strip release paper and a plurality of labels that are temporarily attached on the release paper at predetermined intervals. A label adherend surface of the release paper is coated with a release agent, such as silicone, in order to easily peel off labels.

In another embodiment, the continuous paper "P" may be a label without a release paper.

As shown in FIG. 1, the printer 1 supports the platen roller 10 in a manner rotatable in forward and reverse directions. The platen roller 10 is a feeding unit for feeding the continuous paper "P" pulled out of the paper roll "R" and is formed in such a manner as to extend along a width direction of the continuous paper "P." A gear (not shown) is provided at an end of a platen shaft of the platen roller 10 and is mechanically connected to a roller-driving stepping motor (not shown). The platen roller 10 rotates in accordance with rotation of the stepping motor that operates based on a signal transmitted from a circuit board (not shown).

The thermal head 15 is a print unit for printing information such as characters, symbols, figures, or bar codes, on labels on the continuous paper "P." The thermal head 15 includes a plurality of heating elements (heating resistors) that are arranged along the width direction of the continuous paper "P," and it performs printing by selectively energizing the plurality of heating elements based on signals transmitted from the circuit board.

The thermal head 15 is disposed so as to face the platen roller 10 and nip the continuous paper "P" in cooperation with the platen roller 10 when the printer cover 25 is in a closed state. The coil spring 29 is a biasing member that biases the thermal head 15 to the platen roller 10 and generates a nip pressure appropriate for printing, between the thermal head 15 and the platen roller 10.

In the following description, a direction perpendicular to a feeding direction of the continuous paper "P" (that is, a direction in which the heating elements are arranged) is referred to as a "main scanning direction," and the same direction as the feeding direction of the continuous paper "P" is referred to as a "sub-scanning direction."

Further details of the thermal head 15 will be described later.

Figure 2:
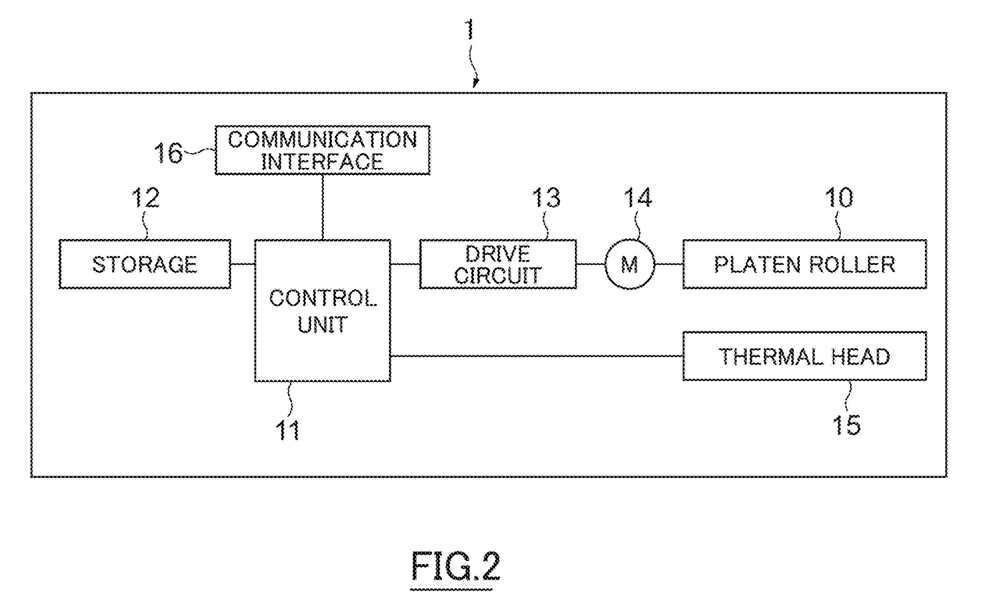
FIG. 2 is a functional block diagram of the printer of an embodiment.

Next, an internal configuration of the printer 1 will be described with reference to FIG. 2. FIG. 2 is a block diagram showing an internal configuration of the printer 1.

As shown in FIG. 2, the printer 1 includes, for example, a control unit 11, a storage 12, a drive circuit 13, a motor 14 that is mechanically coupled to the platen roller 10, a thermal head 15, and a communication interface (I/F) 16.

The control unit 11 includes a controller and a memory and controls operation of the printer 1. A processor reads and executes firmware that is stored in a ROM, in starting up the printer 1.

The controller includes a central processing unit (CPU), as described later, and it executes firmware to control the thermal head 15 to print predetermined information on labels.

The storage 12 is a storage device, such as a solid state drive (SSD). The storage 12 stores a print file that is obtained from a host computer via the communication interface 16, for example. The storage 12 may store information of a print format that is used in printing information on each label.

The drive circuit 13 is a circuit for driving the motor 14, which controls rotation of the platen roller 10, in accordance with a feed request from the control unit 11. The motor 14 is, for example, a stepping motor. The feed request contains, for example, information of a feeding direction (forward direction or reverse direction) and a feeding amount (e.g., the number of steps).

The control unit 11 executes a printing process by controlling to selectively supply current to each heating element of the thermal head 15 based on image data to be printed. The image data is data in which a print file is written in bitmap data. The heating element of the thermal head 15, which generates heat by electric current, is pressed against a label on the continuous paper P that is fed by the platen roller 10. Then, the thermal color developing layer of the label, against which the heating element is pressed, develops color, whereby information is printed on the label.

The communication interface 16 includes a communication circuit for communicating with an external device, such as a host computer.

Figure 3:
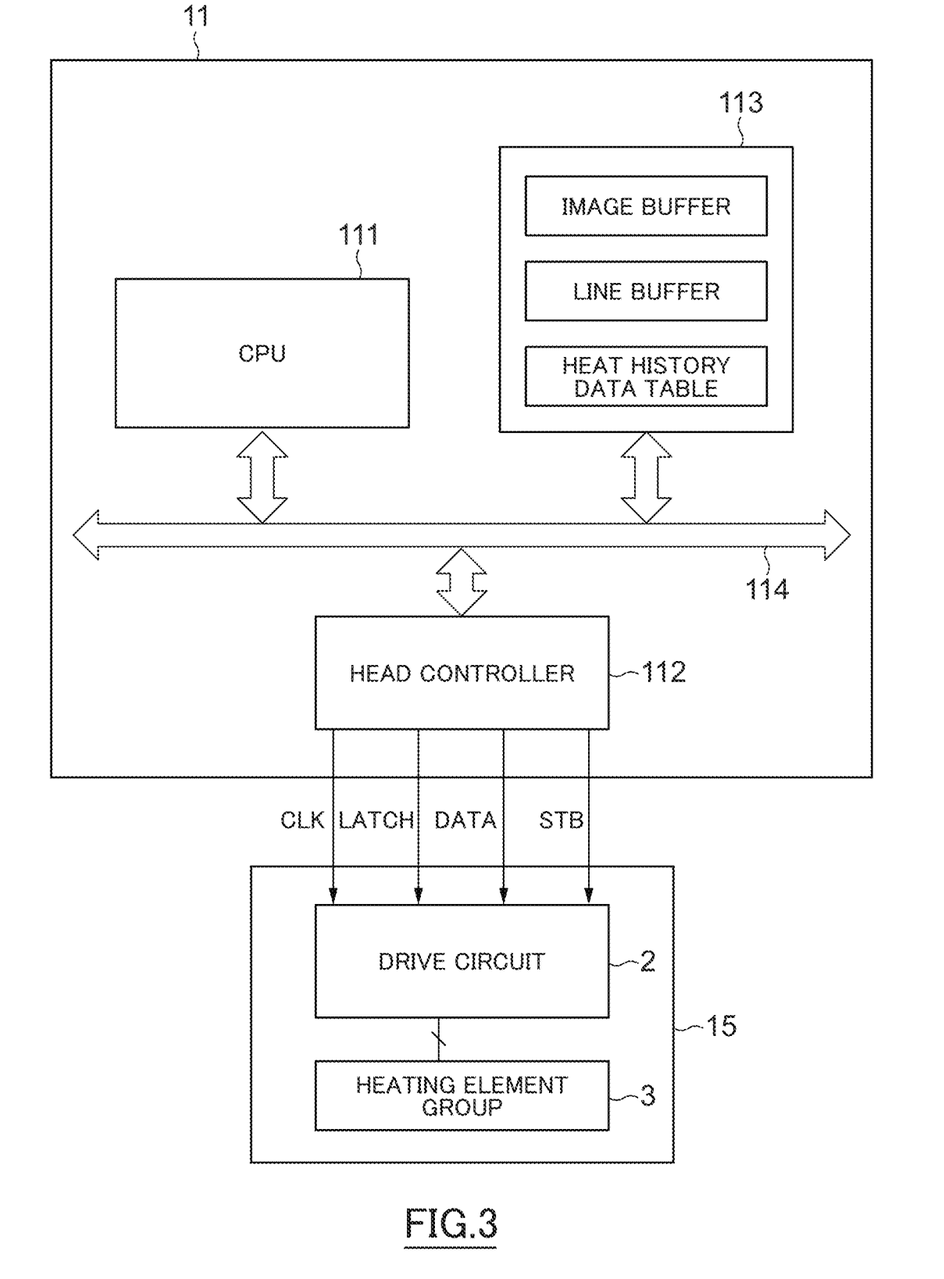
FIG. 3 is a functional block diagram focusing on a control unit and a thermal head of the printer of an embodiment.
Figure 4:
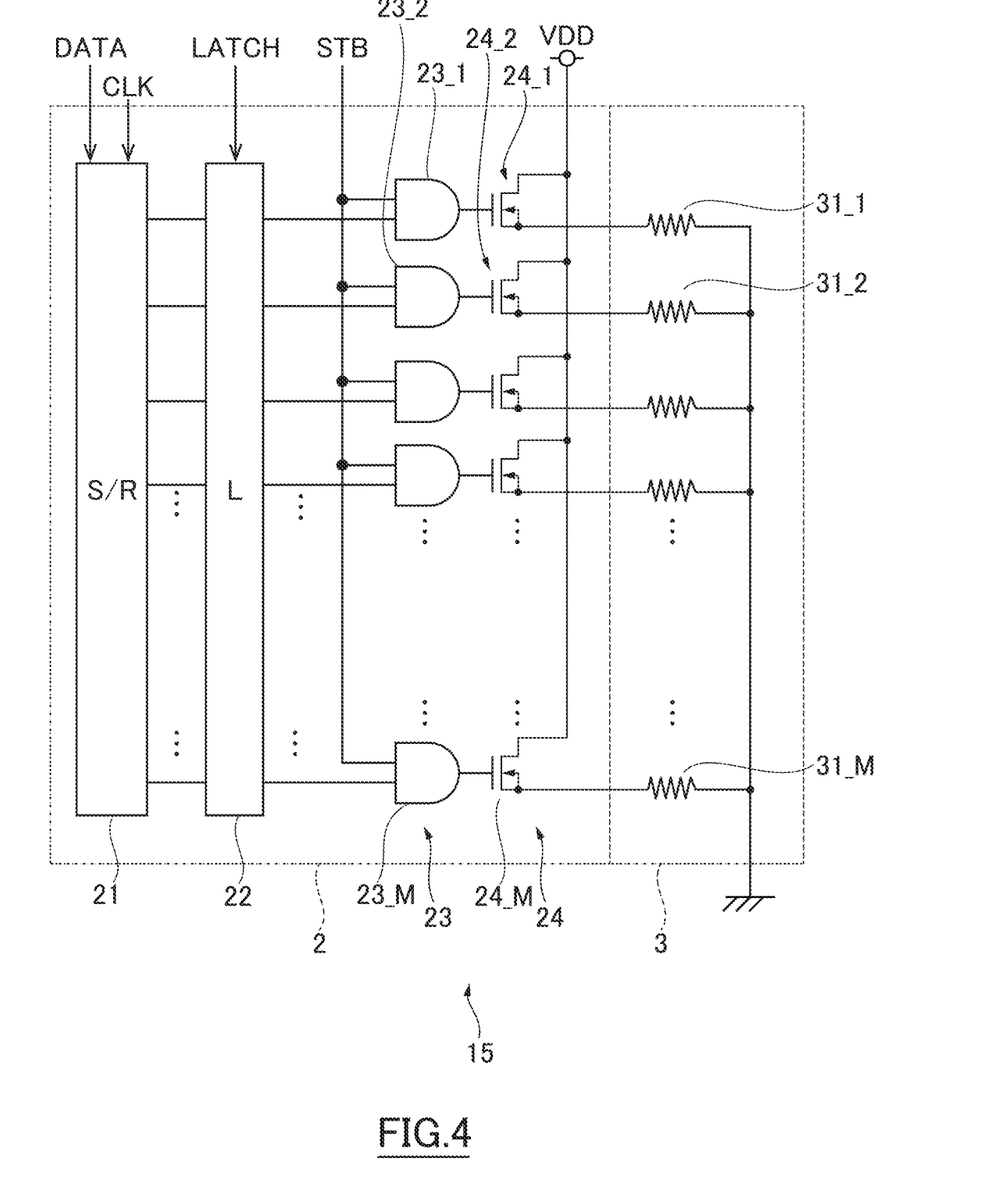
FIG. 4 is a schematic circuit diagram of the thermal head of an embodiment.

Next, a printing operation of the printer 1 will be described with reference to FIGS. 3 and 4. FIG. 3 is a functional block diagram focusing on the control unit and the thermal head of the printer 1 of an embodiment. FIG. 4 is a schematic circuit diagram of the thermal head 15 of an embodiment.

As shown in FIG. 3, the control unit 11 includes a CPU 111, a head controller 112, and a memory 113 (an example of a storage), and they are capable of communicating with one another via a bus 114.

The CPU 111 controls the whole printing operation of the control unit 11. The head controller 112 supplies each type of signal for printing, to the thermal head 15, under control of the CPU 111.

The signals that are supplied to the thermal head 15 by the head controller 112 include a clock pulse CLK, a latch pulse LATCH, a data signal DATA, and a strobe signal STB.

The memory 113 is, for example, a random access memory (RAM), and it includes an image buffer, a line buffer, and a heat history data table that perform a first-in first-out (FIFO) operation.

The CPU 111 executes printing by performing heat history control. The heat history control is control for causing thermal energy in the heating element to be constant by adjusting a pulse width of energizing current (that is, a width of a strobe signal STB; hereinafter referred to as a "strobe application period" as appropriate). This adjustment is performed based on one or both of data of current that was supplied to the heating element in the past and data of current that will be supplied to the heating element in the future.

In order to perform the heat history control, the CPU 111 generates data by converting original image data to be printed, based on print data of a target dot in the original image data and on print data of dots around the target dot. This generated data is referred to as "heat history-reflected data," hereinafter. The heat history-reflected data is stored in the image buffer.

In the following description, the term "image data" means original image data before it is converted into the heat history-reflected data.

In the heat history control, a data signal and a corresponding strobe signal are generated multiple times during one scanning line time (that is, a scanning line time for one line). In the example described later, a data signal and a strobe signal are generated four times during one scanning line time. In this case, for example, assuming that an M number of heating elements are arranged in a line in the thermal head 15, and data for one line (line data) in image data is M bits, data for one line (line data) of the heat history-reflected data is M×4 bits data.

The line data in image data contains print data that indicates whether to print each dot (an example of information on whether to perform printing). The print data shows one of "printing" and "non-printing."

On the other hand, data of each dot in line data of the heat history-reflected data corresponding to data for one line in image data is equivalent to data signals of multiple times, and it indicates one of "energizing" and "non-energizing."

The line buffer sequentially stores line data of the heat history-reflected data.

As described above, the heat history data table is referred to in generating the heat history-reflected data. Details of the heat history data table will be described later.

The head controller 112 generates a data signal DATA based on line data that is sequentially transferred from the line buffer and also generates a strobe signal STB at predetermined times. Transfer of line data from the line buffer to the head controller 112 is performed, for example, by direct memory access (DMA).

The thermal head 15 includes a drive circuit 2 and a heating element group 3.

The heating element group 3 includes a plurality of heating elements (heating resistors) that are arranged on a line.

The drive circuit 2 selectively supplies current to each heating element of the heating element group 3 to cause them to generate heat, based on each type of signal supplied from the head controller 112.

Details of examples of structures of the drive circuit 2 and the heating element group 3 are as follows.

As shown in FIG. 4, the drive circuit 2 of an embodiment includes, at least, a shift register (S/R) 21 for temporarily storing data signals DATA for one line, a latch circuit (L) 22, a gate circuit group 23, and a transistor group 24.

The heating element group 3 includes heating elements (heating resistors) 31_1 to 31_M.

The drive circuit 2 is operated by a data signal DATA, a clock pulse CLK, a latch pulse LATCH, and a strobe signal STB. These data and signals are input or transferred from the head controller 112. The data signals DATA for one line may be transferred by dividing them with the use of a plurality of line buffers, in order to shorten the transfer time. In this case, a divided part of the data signals DATA for one line is stored in each line buffer and is serially transferred from each line buffer.

In the drive circuit 2 in FIG. 4, the strobe signal STB is a positive logic signal; that is, heating element is supplied with current and generates heat when the signal is high level. In another embodiment, the strobe signal STB may be a negative logic signal; that is, a heating element is supplied with current and generates heat when the signal is low level.

The shift register 21 receives data signals DATA for one line synchronously with a clock pulse CLK and stores this signal. The data signal DATA (an example of a pulse of energizing current) contains bit strings in which each bit is high level in the case of "energizing" and is low level in the case of "non-energizing." The latch circuit 22 is connected in parallel to the shift register 21, and it receives the bit strings in the shift register 21 simultaneously in parallel and latches them. Transfer timing of data from the shift register 21 to the latch circuit 22 is controlled by a latch pulse LATCH.

The gate circuit group 23 includes gate circuits (AND circuits) 23_1, 23_2, . . . , and 23_M that respectively correspond to a first dot to a M-th dot in one line. One of input terminals of each gate circuit is supplied with a strobe signal STB, and the other input terminal of each gate circuit is connected to output of the latch circuit 22.

Each gate circuit of the gate circuit group 23 outputs a logical product of the strobe signal STB and a corresponding data signal DATA.

The transistor group 24 includes MOS transistors 24_1 to 24_M. Each MOS transistor turns on and off in accordance with output from a corresponding gate circuit.

While the strobe signal STB is high level, a logic level of an output terminal of each gate circuit of the gate circuit group 23 coincides with an output level of the latch circuit 22. For example, when an output level of the latch circuit 22 is high, which shows "energizing," the output from a corresponding gate circuit is also high level, whereby a corresponding MOS transistor turns on, and current flows to the heating element 31. Conversely, when an output level of the latch circuit 22 is low, which shows "non-energizing," the output from a corresponding gate circuit is also low level, whereby a corresponding MOS transistor turns off, and current does not flow to the heating element 31.

In a case of using a negative logic signal as the strobe signal STB, the following structure can be used.

Specifically, in the structure in FIG. 4, a NAND circuit may be used instead for each gate circuit of the gate circuit group 23, and an inverted signal of the strobe signal STB is input to the NAND circuit. Thus, when the strobe signal STB is low level, the NAND circuit outputs an inverted signal of output of the latch circuit 22. A corresponding MOS transistor is configured to turn on to cause current to flow to the heating element when output of the NAND circuit is low level.

In a case in which the heat history control is not performed, a data signal DATA is sent once to the drive circuit 2 of the thermal head 15 during a scanning line time, with respect to line data for one line. On the other hand, in the case of performing the heat history control, data signals DATA (e.g., data signals DATA_1 to DATA_4 described later) are sent to the drive circuit 2 of the thermal head 15 in a plurality of periods during a scanning line time, with respect to line data for one line.

In the heat history control of an embodiment, the head controller 112 supplies a data signal four times, which are data signals DATA_1 to DATA_4, to the drive circuit 2 at predetermined times synchronized with clock pulses CLK, during a scanning line time.

Assuming that data for one line in image data is M bits, corresponding line data of the heat history-reflected data is M×4 bits data. Each M bits data in this M×4 bits data are supplied to the drive circuit 2 at different four times as the data signals DATA_1 to DATA_4.

The head controller 112 supplies latch pulses LATCH and strobe signals STB_1 to STB_4 to the drive circuit 2 of the thermal head 15, at predetermined times synchronized with clock pulses CLK. The relationship between the transfer timing of the data signal and the application timing of the strobe signal during one scanning line time in the heat history control will be described later.

Next, further details of the heat history data table will be described.

The heat history data table shows relationships among those as follows: print data of a dot to be processed (hereinafter referred to as a "target dot") in a line to be printed in image data (hereinafter referred to as a "target line"), print data of dots corresponding to the target dot, in previous and next lines of the target line (that is, print data in the past and print data in the future), and strobe levels for the target dot during a scanning line time.

Herein, the strobe level represents a level (namely, high level or low level) of a data signal in each strobe application period with respect to a heating element corresponding to a target dot. The level of the data signal shows whether to apply a pulse of energizing current in each strobe application period. The strobe level shows the length of time during which current is substantially supplied to the heating element during a scanning line time. As the strobe level is higher, the time during which current is supplied to the heating element is longer during a scanning line time, and a greater thermal energy is applied to the heating element.

The CPU 111 refers to the heat history data table to determine the level (high level showing "energizing" or low level showing "non-energizing") of a data signal in each strobe application period, with respect to each dot in a target line. This results in appropriately controlling thermal energy to be applied to the heating element that corresponds to a current target dot, in consideration of print data of the current target dot and print data of the dots in the previous and next lines.

In another embodiment, the heat history data table also includes relationships between print data of each dot adjacent to a target dot and strobe levels for the target dot during a scanning line time. The thermal energy that is received from heating elements adjacent to a heating element corresponding to the target dot is also considered by referring to the print data of right and left dots adjacent to the target dot. This enables more appropriately controlling thermal energy to be provided to the heating element corresponding to the current target dot.

In the following description, print data in the past of a target dot means data of a dot at a position corresponding to the target dot, in a line before the line including the target dot in the sub-scanning direction, and it is referred to as "past data" as appropriate.

Print data in the future of a target dot means data of a dot at a position corresponding to the target dot, in a line after the line including the target dot in the sub-scanning direction, and it is referred to as "future data" as appropriate.

Figure 5:
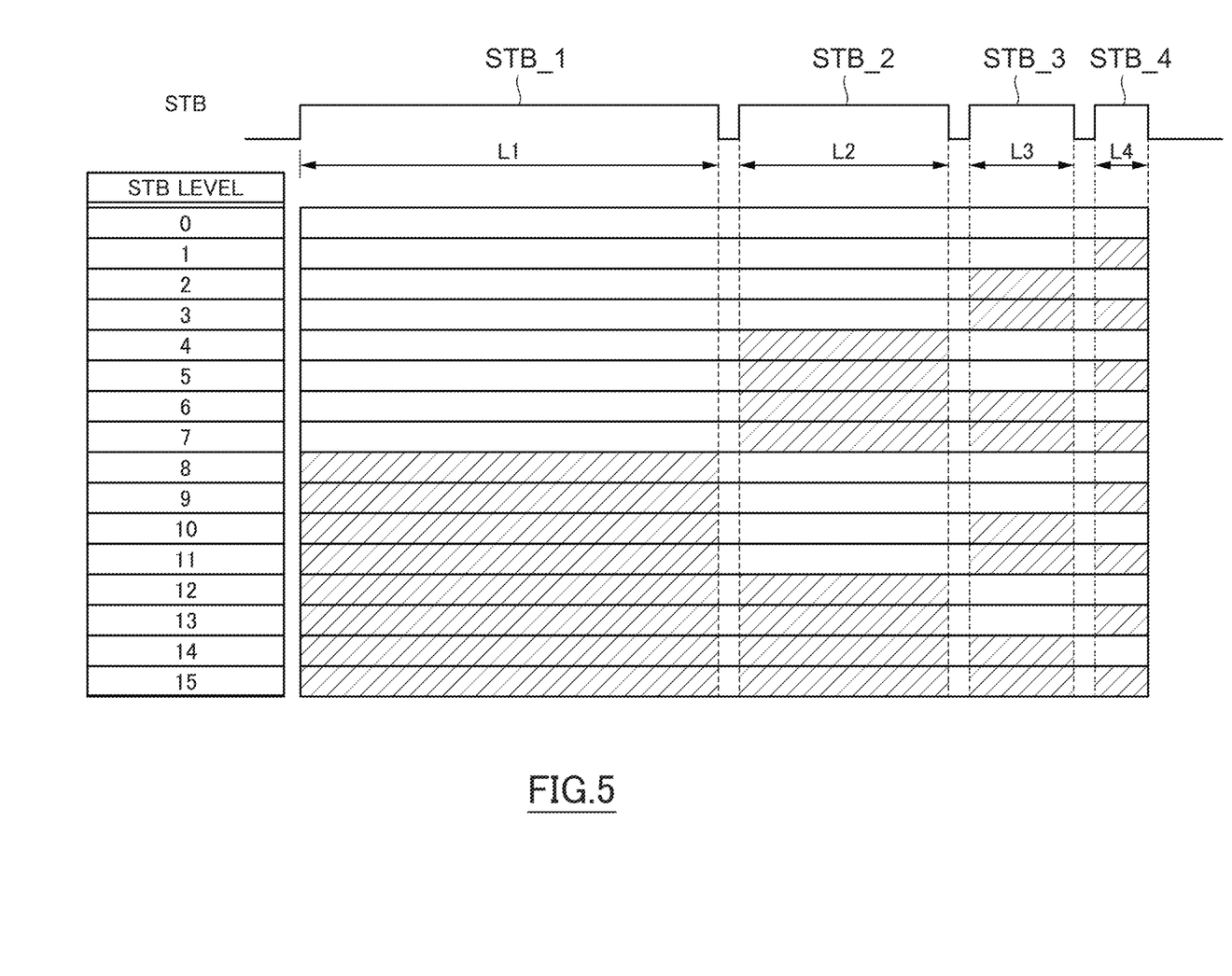
FIG. 5 shows relationships between a strobe level and timing when current substantially flows to a heating element in each period of applying a strobe signal during a scanning line time, in heat history control of an embodiment.

FIG. 5 shows relationships between a strobe level (STB level) and timing when current substantially flows to the heating element in a period of applying each of strobe signals STB_1 to STB_4 during a scanning line time, in the heat history control of an embodiment.

In a case of a thermal head of positive logic, the state in which current substantially flows in the heating element means that corresponding data signals DATA_1 to DATA_4 are high level. That is, the data signals DATA_1 to DATA_4 correspond to the strobe level.

For example, data signals DATA_1 to DATA_4 corresponding to a target dot are four bits data corresponding to the strobe level. In this case, the data signals DATA_1 to DATA_4 as a whole may be "0000" when the strobe level is "0," "0110" when the strobe level is "6," and "1111" when the strobe level is "15."

In an embodiment, when the strobe level is four or greater, thermal energy for changing the color of the thermal color developing layer of a label is applied to the heating element. On the other hand, when the strobe level is less than four, thermal energy for changing the color of the thermal color developing layer of a label is not applied, but instead, an effect for preheating the heating element is obtained.

In an embodiment, as shown in FIG. 5, the four strobe signals STB_1 to STB_4 corresponding to the four data signals are set in the order from a long period to a short period, during a scanning line time. That is, assuming that the lengths of the four strobe signals STB_1 to STB_4 are respectively represented by L1 to L4, a relationship "L1>L2>L3>L4" is satisfied. The advantage of this setting will be described later.

The ratio of the lengths of the four strobe signals STB_1 to STB_4 is preferably 8:4:2:1. Setting the ratio of the lengths in this manner enables increasing the number of combinations of times to apply thermal energy to the heating element (that is, a time to energize the heating element, which is referred to as a "strobe length") during one scanning line time, as great as possible, whereby energy to be applied can be finely set. The ratio of the lengths of the four strobe signals STB_1 to STB_4 is not limited to 8:4:2:1; but 16 ($=2^4$) patterns of strobe lengths that are different from each other can be set by varying the lengths from each other.

Figure 6:
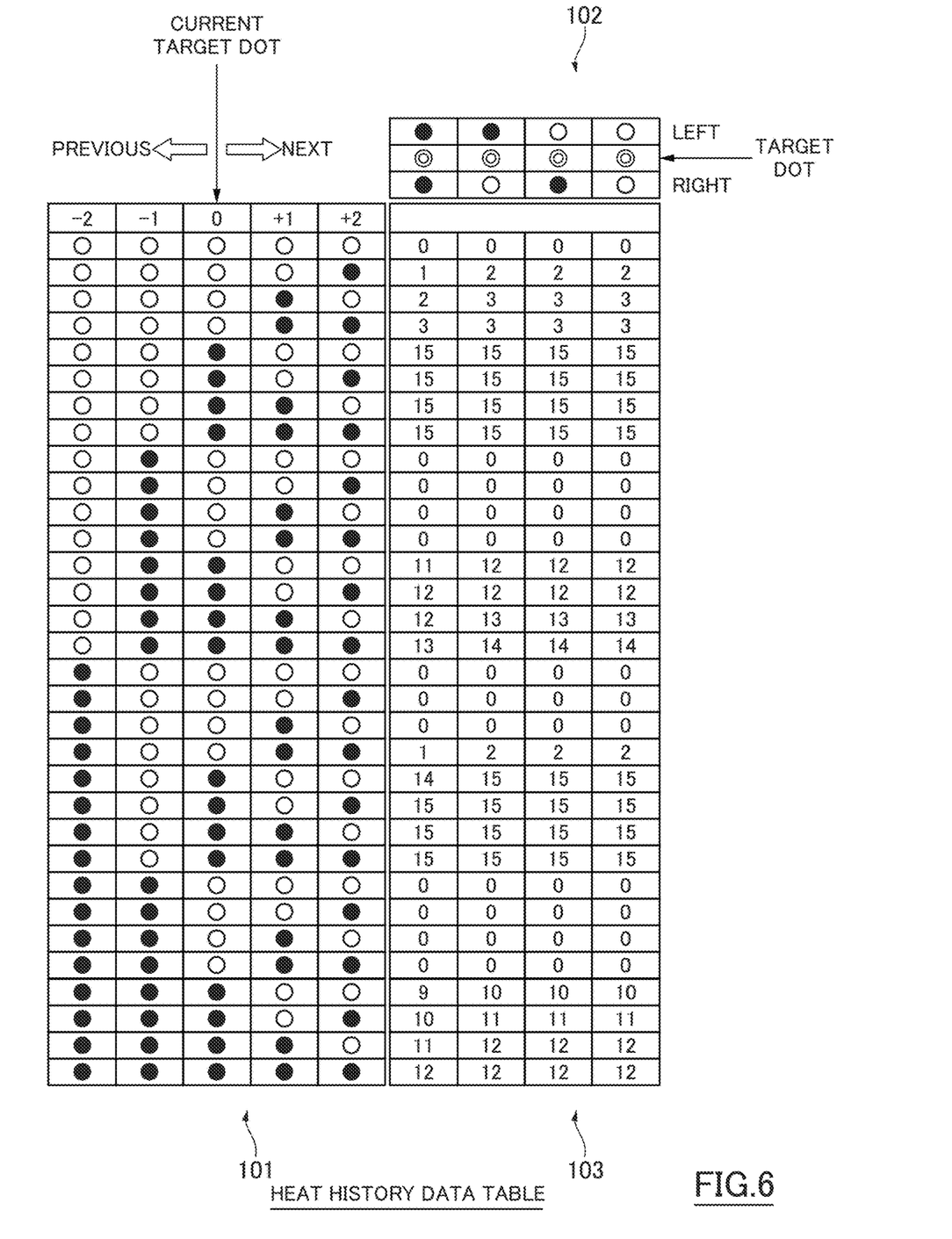
FIG. 6 shows an example of a heat history data table.

An exemplary heat history data table is shown in FIG. 6.

In FIG. 6, the term "target dot" means each dot of line data for a target line (referred to as "target line data") in image data in generating heat history-reflected data.

The heat history data table in FIG. 6 shows strobe levels set to the current target dot, in accordance with combinations of: print data (•: "printing," ○: "non-printing") of the current target dot in target line data; past data of a dot for one line before the target dot; past data of a dot for two lines before the target dot; future data of a dot for one line after the target dot; and future data of a dot for two lines after the target dot.

In FIG. 6, previous-and-next dot patterns 101 show 32 ($=2^5$) patterns of combinations of: print data corresponding to past data of a dot for one line before the current target dot (shown by "−1"); past data of a dot for two lines before the current target dot (shown by "−2"); future data of a dot for one line after the current target dot (shown by "+1"); and future data of a dot for two lines after the current target dot (shown by "+2").

In an embodiment, right and left dots adjacent to the current target dot are also considered in generating heat history-reflected data.

In FIG. 6, adjacent dot patterns 102 show 4 ($=2^2$) patterns of combinations of print data of right and left dots adjacent to the current target dot.

In FIG. 6, the strobe level data 103 shows strobe levels (one of values 0 to 15) of each of 32×4 patterns of combinations based on the previous-and-next dot patterns 101 and the adjacent dot patterns 102, with respect to the current target dot.

Figure 7:
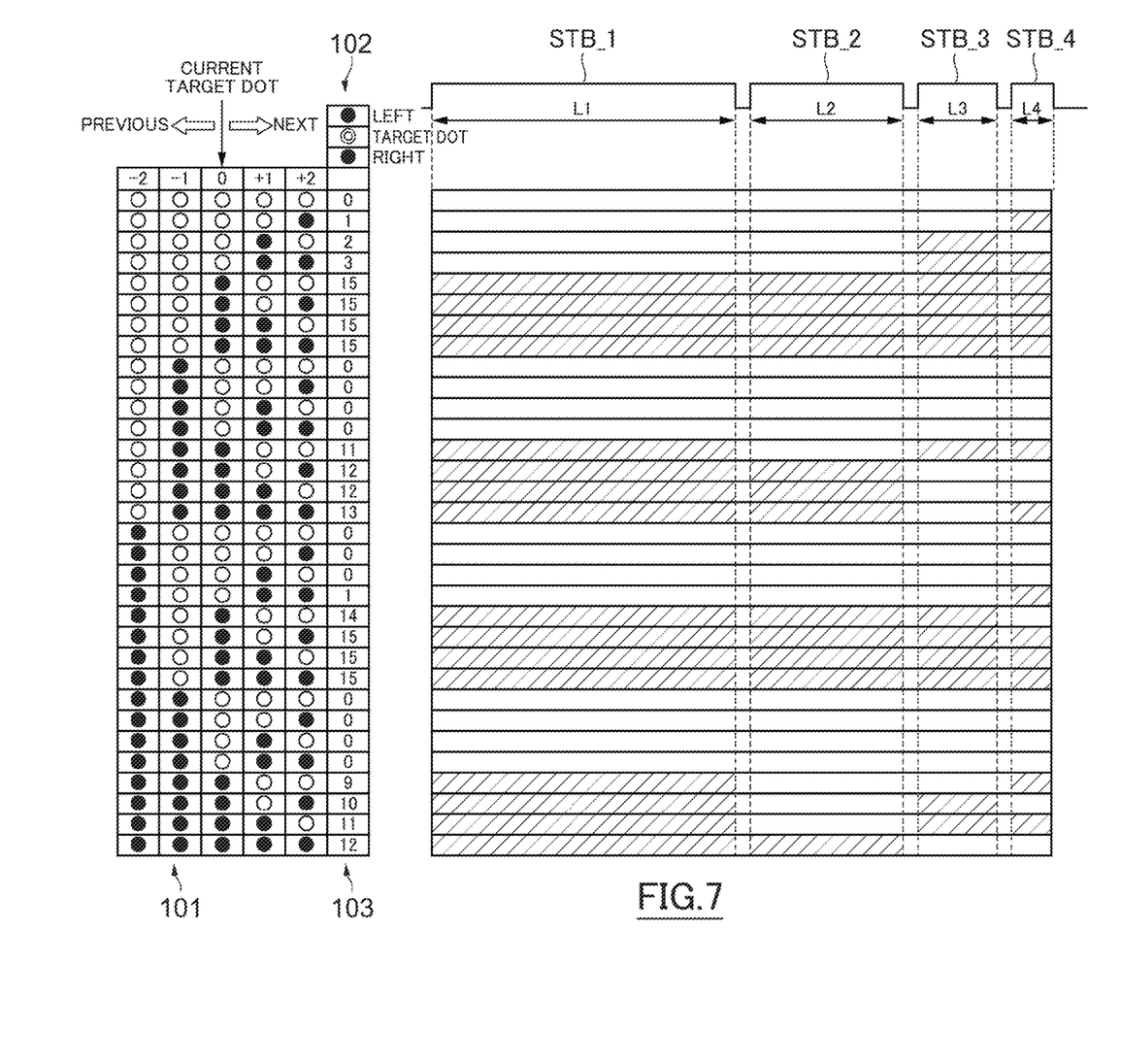
FIG. 7 shows the heat history data table in FIG. 6 and examples of application patterns of strobe signals.

FIG. 7 shows timings in which current substantially flows to the heating element in each period for applying the strobe signal, for 32 patterns of combinations in which pieces of print data of the right and left dots adjacent to the current target dot are "printing" (•), among the 32×4 patterns of combinations shown in FIG. 6. The relationships between the strobe level corresponding to each pattern, which is determined by the strobe level data 103, and each of times when current substantially flows to the heating element, are the same as those shown in FIG. 5.

The CPU 111 refers to the heat history data table, which is shown as an example in FIG. 6, to determine the strobe level from the strobe level data 103, with respect to each target dot in target line data. The CPU 111 generates heat history-reflected data by allocating four bits data corresponding to the strobe level, to each target dot.

The head controller 112 respectively allocates the first to the fourth bits data to the data signals DATA_1 to DATA_4, with respect to each target dot of the line data in the heat history-reflected data.

Next, the transfer time of the data signal and the application time of the strobe signal in printing by performing the heat history control will be described with reference to FIGS. 8 and 9.

Figure 8:
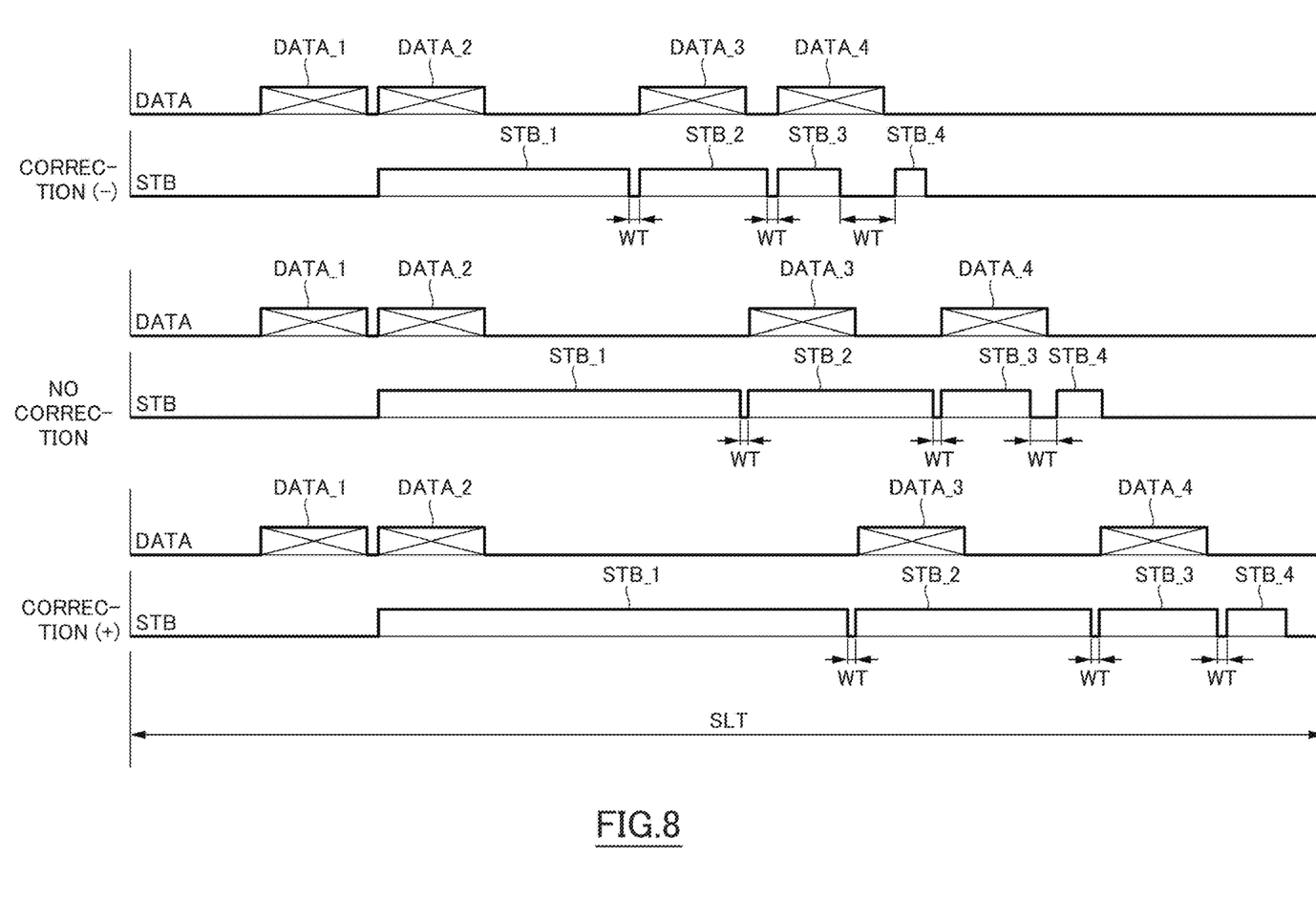
FIG. 8 shows timing diagrams showing transfer times of data signals and application times of strobe signals during a scanning line time, in the printer of an embodiment.

FIG. 8 shows timing diagrams showing transfer times of the data signal and application times of the strobe signal during a scanning line time SLT, in the printer 1 of an embodiment. FIG. 9 shows timing diagrams showing transfer times of the data signal and application times of the strobe signal during a scanning line time SLT of a comparative example.

Figure 9:
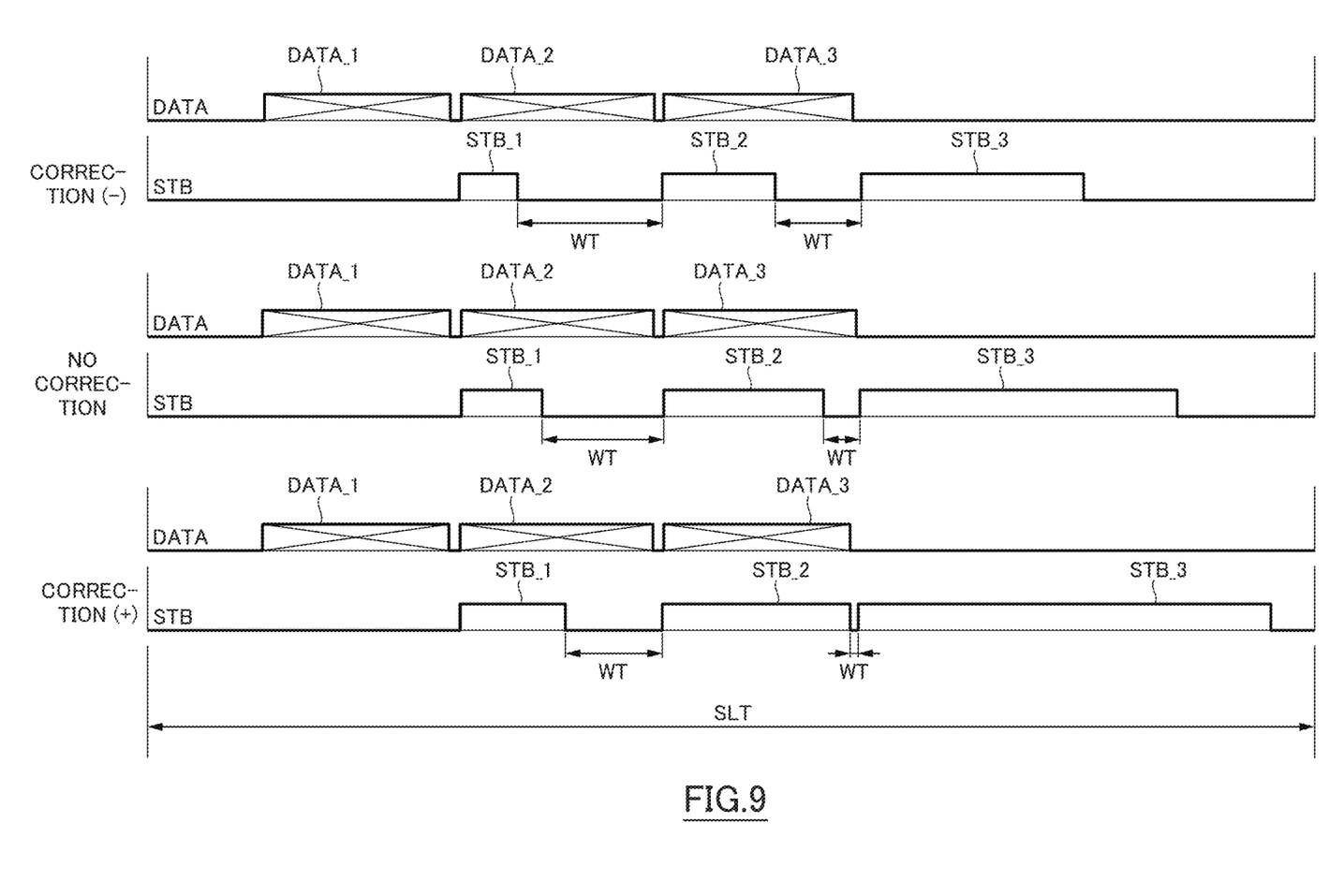
FIG. 9 shows timing diagrams showing transfer times of data signals and application times of strobe signals during a scanning line time of a comparative example.

In FIGS. 8 and 9, a wait time WT is set between successive strobe application periods.

In addition, among the timing diagrams in FIGS. 8 and 9, timing diagrams for "no correction" are used for a case of performing printing at a standard optical density. Among the timing diagrams in FIGS. 8 and 9, timing diagrams for "correction (−)" are used for a case of performing printing at optical density lower than the standard optical density at corrected times, and timing diagrams for "correction (+)" are used for a case of performing printing at optical density higher than the standard optical density at corrected times.

In correcting times in accordance with optical density, a corrected length of each strobe signal is determined by multiplying the length of each strobe signal for the standard optical density by a predetermined constant of proportionality corresponding to the optical density set in the printer 1. This constant of proportionality is a positive value less than 1 in the case of "correction (−)" and is a value greater than 1 in the case of "correction (+)." In each timing diagram in FIGS. 8 and 9, timing is corrected so that the last strobe application period will be contained during the scanning line time SLT.

As shown in FIG. 8, in an embodiment, the four strobe signals STB_1 to STB_4 respectively corresponding to the four data signals DATA_1 to DATA_4 are set in the order from a long period to a short period. On the other hand, in the comparative example shown in FIG. 9, three strobe signals STB_1 to STB_3 respectively corresponding to three data signals DATA_1 to DATA_3 are set in the order from a short period to a long period.

Setting the plurality of strobe signals in the order from a long period to a short period during a scanning line time SLT, as shown in FIG. 8, provides the following effects advantageous over the comparative example shown in FIG. 9.

(i) In the example of FIG. 8, one or both of the long-period strobe signals STB_1 and STB_2 are set for the purpose of printing, and one or both of the short-period strobe signals STB_3 and STB_4 are set for the purpose of preheating. The strobe signal that is set for the purpose of preheating is allocated close to the end of the scanning line time SLT, whereby a time to wait for a printing strobe signal of the next scanning line time SLT is shortened, and thus, a preheating efficiency is increased. If the time between the strobe signal set for the purpose of preheating and the printing strobe signal of the next scanning line time SLT is long, the heating elements that have been preheated are cooled during this time, and the effect of preheating is not sufficiently obtained. In contrast, in FIG. 8, the time between the strobe signal set for the purpose of preheating and the printing strobe signal of the next scanning line time SLT is relatively short, whereby the heating elements that have been preheated are prevented from being cooled during this time, and thus, the effect of preheating is obtained. That is, the preheating efficiency is increased.

(ii) Sequentially allocating the strobe signals in the order from a long period during the scanning line time SLT shortens the wait times WT and improves data transfer efficiency.

With reference to FIG. 9, the length of the first strobe signal STB_1 during the scanning line time SLT is shorter than the data transfer time of the data signal DATA_2, and therefore, in order to make the next strobe signal STB_2 be high level, a relatively long wait time WT for waiting for data transfer of the data signal DATA_2 is generated. Similarly, the length of the strobe signal STB_2 is shorter than the data transfer time of the data signal DATA_3, and therefore, in order to make the next strobe signal STB_3 be high level, a relatively long wait time WT results for waiting for data transfer of the data signal DATA_3. The data signal is transferred three times in the comparative example in FIG. 9; but in transferring the data signal four times as in the case in FIG. 8, the number of wait times WT is further increased.

On the other hand, sequentially allocating the strobe signals in the order from a long period during the scanning line time SLT, as shown in FIG. 8, enables allocating the plurality of strobe application periods in a concentrated manner, resulting in shortening the wait times WT. In other words, a time of period from a start time of the first strobe application period to an end time of the final strobe application period is shortened during the plurality of strobe application periods. Thus, the ratio of this time relative to the scanning line time SLT is reduced. From another point of view, the ratio of the time of the strobe application period, in the period of time from the start time of the first strobe application period to the end time of the final strobe application period, is increased during the plurality of strobe application periods.

(iii) Sequentially allocating the strobe signals in the order from a long period during the scanning line time SLT shortens the wait times WT, whereby thermal energy is stably controlled.

The heating elements are cooled during each of the wait times WT. In a case in which the wait time WT is long, the degree of cooling the heating elements is difficult to predict. As a result, a desired effect may not be achieved by a preheating strobe signal.

In addition, variations in lengths of the wait times WT due to correction of density are relatively small in the timing diagrams of FIG. 8, whereas variations in lengths of the wait times WT due to correction of density are relatively large in the timing diagrams of FIG. 9. This is because the lengths of the strobe signals STB_1 and STB_2, which are allocated in the earlier periods during the scanning line time SLT, are shorter than the data transfer times of the data signals, in the timing diagrams in FIG. 9. That is, in the case of sequentially allocating the strobe signals in the order from a short period during the scanning line time SLT, as shown in FIG. 9, variations in lengths of the wait times WT are large, and thermal energy in the heating elements may not be stably controlled.

Conversely, sequentially allocating the strobe signals in the order from a long period during the scanning line time SLT, as shown in FIG. 8, makes it easy to predict the effect of preheating and stabilizes control of thermal energy for the heating elements.

A printing control method according to an embodiment is executed by the control unit 11 and includes the following steps (a) and (b).

Step (a): a step of sequentially transferring line data in image data

Step (b): a step of determining whether to apply respective DATA signals (pulses of energizing current) in a plurality of strobe application periods, with respect to each dot in a target line, based on print data of a target dot in the print target line and on print data of dots corresponding to the target dot, in previous and next lines of the target line Herein, the plurality of strobe application periods are set in the order from a long period to a short period during a scanning line time in step (b).

A program according to an embodiment is a program configured to cause a computer to execute the printing control method. For example, in response to the CPU 111, which is included in the control unit 11 of the printer 1, executing the program, the printing control method is executed.

In an embodiment, this program may be recorded in a non-transitory computer-readable recording medium.

In an embodiment, the printer may be a thermal transfer printer that transfers ink, which is applied to an ink ribbon, to labels by heat of a thermal head, instead of a direct thermal printer that prints labels having a thermal color developing layer. That is, the above-described method for controlling thermal energy in the plurality of heating elements of the thermal head can be employed in a thermal transfer printer.

Although details of some embodiments of the printer, the printing control method, and the program of the present invention are described above, the scope of the present invention should not be limited to the foregoing embodiments. In addition, the embodiments described above can be variously modified and altered within the scope not departing from the gist of the present invention.

Although an example of setting four strobe application periods during a scanning line time is described in relation to the foregoing embodiments, the number of the periods is not limited thereto and may be five or greater. Increasing the number of strobe application periods enables greater number of strobe levels, resulting in more precise control.

The present invention is related to Japanese Patent Application No. 2021-21445 filed with the Japan Patent Office on Feb. 15, 2021, the entire contents of which are incorporated into this specification by reference.

The invention claimed is:

1. A printer configured to print on a print medium, the printer comprising:
    a thermal head comprising a plurality of heating elements that are arranged in a line; and
    a processor configured to control thermal energy to be applied to the plurality of heating elements in accordance with information based on image data, the information including whether to apply a pulse of energizing current in each of a plurality of periods that are preset during a scanning line time for one line, wherein:
    the plurality of periods are set in an order from a long period to a short period during the scanning line time, and
    the plurality of periods include four periods and a period length ratio of the four periods is 8:4:2:1.

2. The printer according to claim 1, wherein the plurality of periods have mutually different lengths.

3. The printer according to claim 1, wherein a shortest period among the plurality of periods has a length that does not allow the print medium to develop color when the pulse of energizing current is applied in the shortest period.

4. The printer according to claim 1, wherein the length of the shortest period among the plurality of periods is shorter than a transfer time of image data for one line.

5. The printer according to claim 1, wherein the processor is configured to adjust optical density such that each of the lengths of the plurality of periods is adjusted by multiplying each of unadjusted lengths of the plurality of periods by the same constant of proportionality.

6. The printer according to claim 1, further comprising:
    a storage that is configured to store pulse application information in which a first piece of information on whether to print a target dot of a print target line and a second piece of information on whether to print dots of previous and next lines of the print target line corresponding to the target dot are associated with the information on whether to apply the pulse of energizing current to at least one of the plurality of heating elements corresponding to the target dot in each of the plurality of periods,
    wherein the processor is configured to refer to the pulse application information to determine whether to apply the pulse of energizing current in each of the plurality of periods with respect to each dot of the print target line.

7. The printer according to claim 6, wherein, in the pulse application information, a piece of information on whether to print each dot that is adjacent to the target dot is further associated with the information on whether to apply the pulse of energizing current to the at least one of the plurality of heating elements corresponding to the target dot in each of the plurality of periods.

8. The printer according to claim 2, wherein a shortest period among the plurality of periods has a length that does not allow the print medium to develop color when the pulse of energizing current is applied in the shortest period.

9. The printer according to claim 2, wherein the length of the shortest period among the plurality of periods is shorter than a transfer time of image data for one line.

10. The printer according to claim 3, wherein the length of the shortest period among the plurality of periods is shorter than a transfer time of image data for one line.

11. The printer according to claim 8, wherein the length of the shortest period among the plurality of periods is shorter than a transfer time of image data for one line.

12. The printer according to claim 2, wherein the processor is configured to adjust optical density such that each of the lengths of the plurality of periods is adjusted by multiplying each of unadjusted lengths of the plurality of periods by the same constant of proportionality.

13. The printer according to claim 3, wherein the processor is configured to adjust optical density such that each of the lengths of the plurality of periods is adjusted by multiplying each of unadjusted lengths of the plurality of periods by the same constant of proportionality.

14. The printer according to claim 4, wherein the processor is configured to adjust optical density such that each of the lengths of the plurality of periods is adjusted by multiplying each of unadjusted lengths of the plurality of periods by the same constant of proportionality.

15. A printing control method of a printer that is configured to print on a print medium by using a thermal head comprising a plurality of heating elements arranged in a line, the printing control method comprising:
    sequentially transferring data of each line in image data; and
    determining, based on information on whether to print a target dot of a print target line and information on whether to print dots of previous and next lines of the print target line corresponding to the target dot, whether to apply respective pulses of energizing current in each of a plurality of periods with respect to each dot of a print target line, wherein:
    the plurality of periods are preset during a scanning line time for one line,
    the plurality of periods are set in an order from a long period to a short period during the scanning line time, and
    the plurality of periods include four periods and a period length ratio of the four periods is 8:4:2:1.

16. A non-transitory storage medium storing a program that is configured to cause a computer to execute a method to print on a print medium by using a thermal head comprising a plurality of heating elements that are arranged in a line, the method comprising:
    sequentially transferring data of each line in image data; and
    determining, based on information on whether to print a target dot of a print target line and information on whether to print dots of previous and next lines of the print target line, whether to apply respective pulses of energizing current in each of a plurality of periods with respect to each dot of a print target line, wherein:
    the plurality of periods are preset during a scanning line time for one line,
    the plurality of periods are set in an order from a long period to a short period during the scanning line time, and
    the plurality of periods include four periods and a period length ratio of the four periods is 8:4:2:1.

* * * * *